(12) United States Patent
Asada (10) Patent No.: US 7,568,736 B2
(45) Date of Patent: Aug. 4, 2009

(54) JOINT STRUCTURE OF BRANCH CONNECTOR FOR COMMON RAIL

(75) Inventor: Kikuo Asada, Mishima (JP)

(73) Assignee: Usui Kokusai Sangyo Kaisha Limited (JP)

( * ) Notice: Subject to any disclaimer, the term of this patent is extended or adjusted under 35 U.S.C. 154(b) by 51 days.

(21) Appl. No.: 11/127,896

(22) Filed: May 12, 2005

(65) Prior Publication Data

US 2005/0275218 A1    Dec. 15, 2005

(30) Foreign Application Priority Data

May 19, 2004    (JP)    ............... 2004-149393

(51) Int. Cl.
*F16L 19/00*    (2006.01)
(52) U.S. Cl. .................. 285/354; 285/125.1; 285/189; 285/389
(58) Field of Classification Search ............. 285/125.1, 285/143.1, 189, 354, 386, 389
See application file for complete search history.

(56) References Cited

U.S. PATENT DOCUMENTS

| | | | |
|---|---|---|---|
| 4,266,577 A | 5/1981 | Usui | |
| 4,705,306 A | 11/1987 | Guido et al. | |
| 4,832,376 A | 5/1989 | Sugao | |
| 4,893,601 A | 1/1990 | Sugao | |
| 4,900,180 A | 2/1990 | Takikawa | |
| 5,120,084 A | 6/1992 | Hashimoto | |
| 5,143,410 A | 9/1992 | Takikawa | |
| 5,169,182 A | 12/1992 | Hashimoto | |
| 5,172,939 A | 12/1992 | Hashimoto | |
| 5,667,255 A | 9/1997 | Kato | |
| 5,887,910 A | 3/1999 | Usui | |
| 5,903,964 A | 5/1999 | Uematsu et al. | |
| 5,957,507 A | 9/1999 | Asada | |
| 5,979,945 A | 11/1999 | Hitachi et al. | |
| 5,992,904 A | 11/1999 | Hitachi et al. | |
| 6,045,162 A * | 4/2000 | Haibara | ................ 285/55 |
| 6,050,611 A | 4/2000 | Asada | |
| 6,070,618 A | 6/2000 | Iwabuchi | |
| 6,126,208 A | 10/2000 | Asada et al. | |
| 6,397,881 B1 | 6/2002 | Asada et al. | |
| 6,408,826 B2 | 6/2002 | Asada et al. | |

(Continued)

FOREIGN PATENT DOCUMENTS

DE    NR 217783    10/1961

(Continued)

*Primary Examiner*—Aaron M Dunwoody
*Assistant Examiner*—Fannie Kee
(74) *Attorney, Agent, or Firm*—Gerald E. Hespos; Anthony J. Casella (57) ABSTRACT

A joint structure of a branch connector for a common rail capable of securing axial force applied to a seal surface and a branch connector and increasing bending fatigue strength of the branch connector is provided. In the joint structure of the branch connector for the common rail which includes a screw sleeve concentric with a bearing surface of a main pipe rail and connects a branch connector to the main pipe rail via a sleeve washer which has been externally fixed to the branch connector in advance to be combined therewith as one piece, a clearance is provided between an inner surface of the sleeve washer at an external opening thereof and an outer surface of the branch connector.

18 Claims, 9 Drawing Sheets

| U.S. PATENT DOCUMENTS | | | |
|---|---|---|---|
| 6,415,768 B1 | 7/2002 | Usui | |
| 6,463,909 B2 | 10/2002 | Asada et al. | |
| 6,494,183 B2 | 12/2002 | Usui et al. | |
| 6,736,431 B2 * | 5/2004 | Jung et al. | 285/288.1 |
| 6,840,283 B2 | 1/2005 | Furugen et al. | |
| 6,843,275 B2 | 1/2005 | Kato | |
| 7,040,292 B2 * | 5/2006 | Bruehmann et al. | 123/467 |

| FOREIGN PATENT DOCUMENTS | | | |
|---|---|---|---|
| JP | 03-177693 | 8/1991 | |
| JP | 04-175462 | 6/1992 | |
| JP | 2001-082664 | 3/2001 | |
| JP | 2002-130076 | 5/2002 | |
| WO | WO 03/081021 | * | 10/2003 |

* cited by examiner

JOINT STRUCTURE OF BRANCH CONNECTOR FOR COMMON RAIL

TECHNICAL FIELD

The present invention relates to a joint structure of a branch connector formed by a branch pipe, a branch fitting or the like included in a common rail such as a high pressure fuel manifold which is typically used in an accumulator fuel injection system of a diesel internal combustion engine.

BACKGROUND ART

Figure 10:
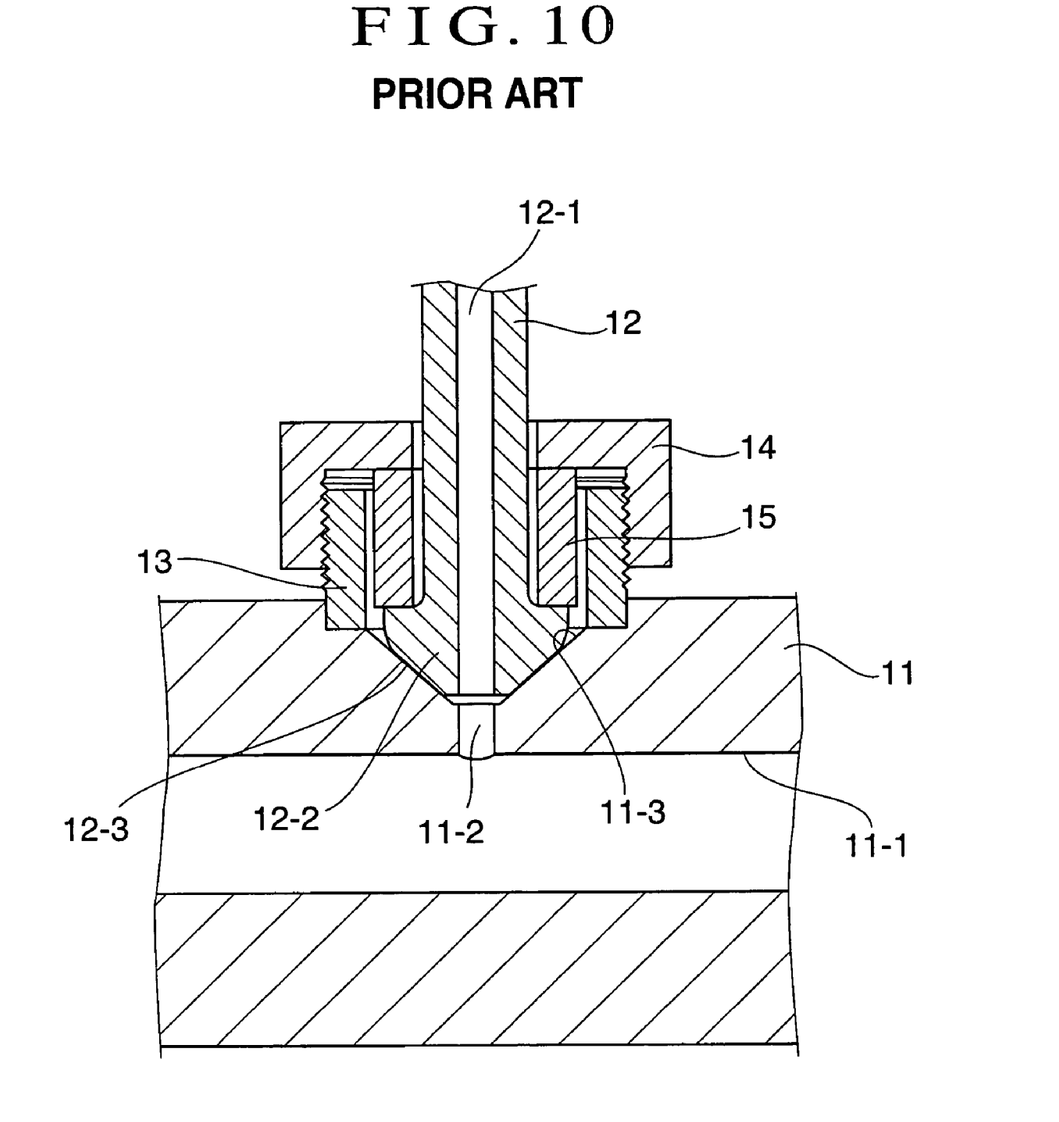
FIG. 10 is vertical cross-sectional view of an example of a prior art joint structure of a branch connector for a common rail.

FIG. 10 illustrates an example of a joint structure of a branch connector of this type (see JP-A-10-213044). This branch connector has the following connecting structure. A pressure-receiving bearing surface 11-3 opening to the outside is formed at the position of a branch hole 11-2. The branch hole 11-2 provided on a peripheral wall of a main pipe rail 11 in the form of a circular pipe communicates with an internal flow passage 11-1. A screw sleeve (pipe-shaped sleeve nipple) 13 is welded or brazed to an outer peripheral wall of the main pipe rail 11 in the vicinity of the pressure-receiving bearing surface 11-3. A pressing bearing surface 12-3 is formed by a connecting head 12-2 provided at the tip of a branch connector 12. The branch connector 12 has a flow path 12-1 for communicating with the flow passage 11-1. The pressing bearing surface 12-3 contacts and engages with the pressure-receiving bearing surface 11-3. A tightening cap nut 14 is externally attached to a sleeve washer 15 which has been fitted to the branch connector 12 with clearance in advance, and is brought into screw-engagement with the screw sleeve 13. In this structure, the branch connector 12 is tightly fitted by pressure applied to the neck of the connecting head 12-2 to be thereby connected.

Figure 11:
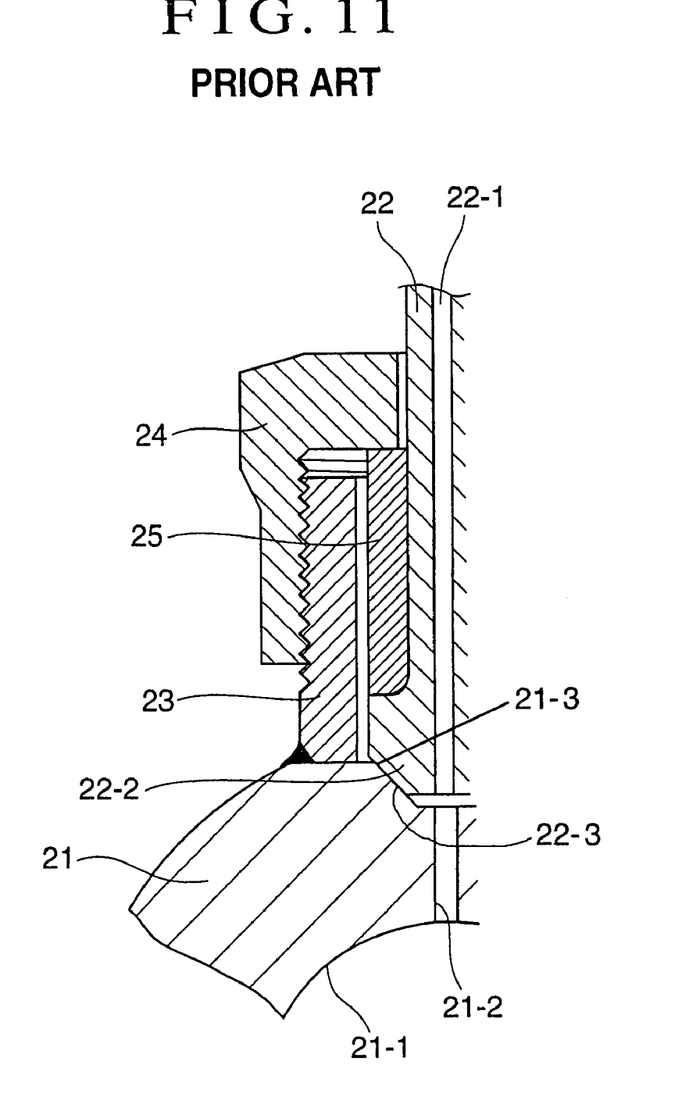
FIG. 11 is vertical cross-sectional view of another example of a prior art joint structure of a branch connector for a common rail.

FIG. 11 illustrates another example of the joint structure of the branch connector (see JP-A-2001-82664). In this example, the joint structure of the branch connector is basically similar to the joint structure shown in FIG. 10, having the following structure: a pressure-receiving bearing surface 21-3 opening to the outside is formed at the position of a branch hole 21-2 which is provided on a peripheral wall of a main pipe rail 21 to communicate with an internal flow passage 21-1; a screw sleeve (pipe-shaped sleeve nipple) 23 is welded or brazed to a peripheral surface of the pressure-receiving bearing surface 21-3; a pressing bearing surface 22-3 is formed by a connecting head 22-2 provided at the tip of a branch connector 22 which has a flow path 22-1 for communicating with the flow passage 21-1; the pressing bearing surface 22-3 contacts and engages with the pressure-receiving bearing surface 21-3; a tightening cap nut 24 is externally attached to a sleeve washer 25 which has been fitted to the branch connector 22 with clearance in advance; and the tightening cap nut 24 is brought into screw-engagement with the screw sleeve 23 such that the branch connector 22 can be connected. In this structure, the sleeve washer 25 is externally fixed to the branch connector 22 by caulking or other method to be combined therewith into one piece so that the branch connector 22 can be connected.

Figure 12:
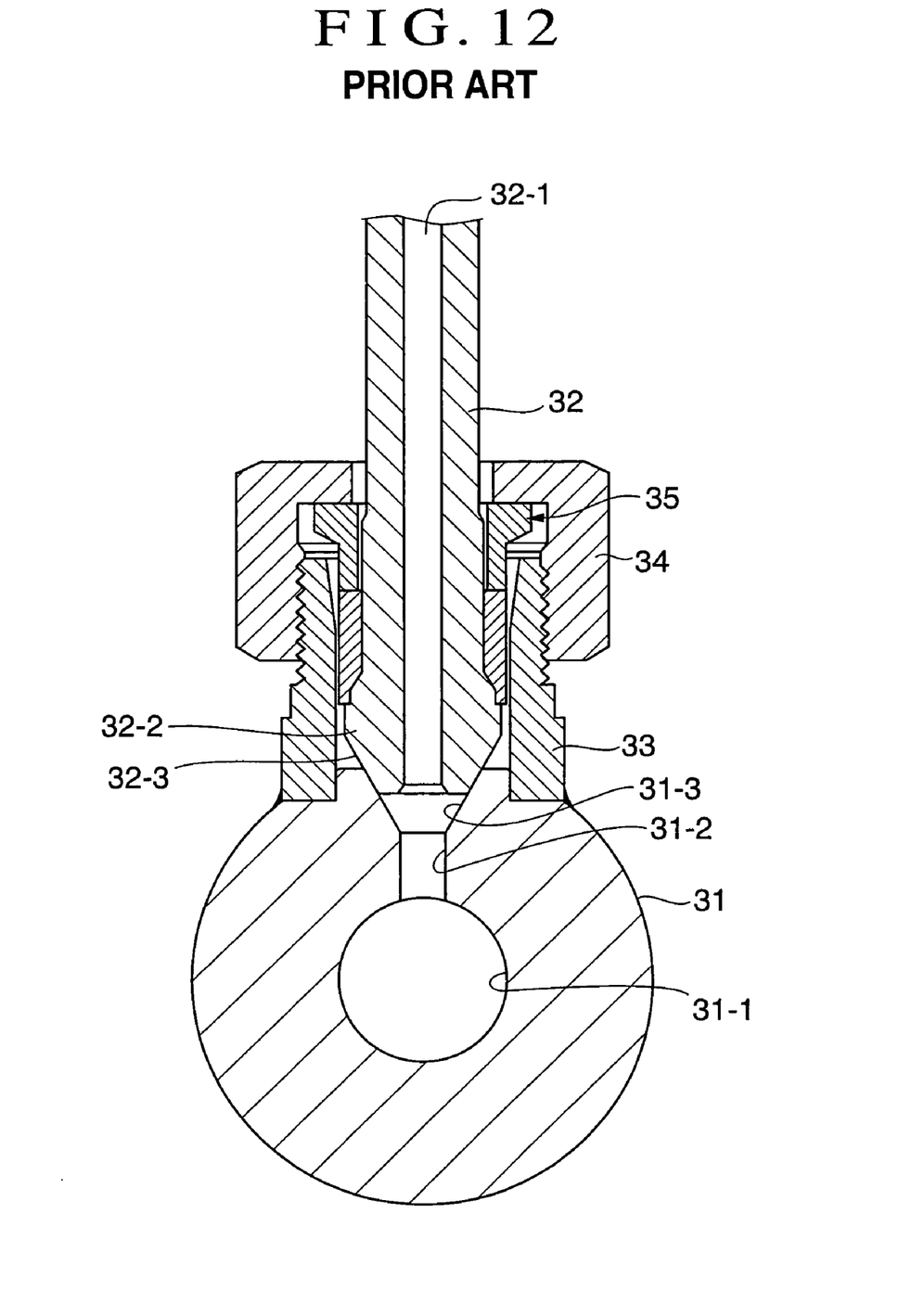
FIG. 12 is vertical cross-sectional view of still another example of a prior art joint structure of a branch connector for a common rail.

FIG. 12 illustrates still another example of the joint structure of the branch connector (Japanese Patent Application No. 2000-174009). In this joint structure of the branch connector, the sleeve washer is split into two washers, each of which is externally fitted to the branch connector in such a manner as to be laterally slidable away from each other along the contact surface. The washer of the sleeve washer disposed near the nut is floatable, and the other washer disposed near the main pipe rail is caulked to the branch connector. In this structure: a flow passage 31-1 is provided inside a main pipe rail 31 in the direction of the axial center; a branch hole 31-2 is formed on a peripheral wall of the main pipe rail 31 keeping a distance from another branch hole in the axial direction; a pressure-receiving bearing surface 31-3 is formed on a peripheral surface of the branch hole 31-2 to be open to the outside; a screw sleeve (pipe-shaped sleeve nipple) 33 which is concentric with the pressure-receiving bearing surface 31-3 is welded or brazed to a main pipe rail 31 in such a position as to surround the pressure-receiving bearing surface 31-3; a pressing bearing surface 32-3 is formed by a connecting head 32-2 provided at the tip of a branch connector 32 which has a flow path 32-1 for communicating with the flow passage 31-1; the pressing bearing surface 32-3 contacts and engages with the pressure-receiving bearing surface 31-3; a tightening cap nut 34 is externally attached to a floating-type sleeve washer 35 which has been split into two parts and externally fitted to the branch connector 32 in advance; and the tightening cap nut 34 is brought into screw-engagement with the screw sleeve 33 such that the branch connector 32 is tightly fitted by pressure applied to the neck of the connecting head 32-2 and is thereby connected.

In the above-described joint structures of the branch connectors, the seal surface is not only a tapered surface but also a spherical surface. The pressing surface of the tightening nut is not only a flat surface but also a spherical surface. In the case of the spherical surface, the pressure-receiving surface of the sleeve washer is a spherical surface similarly to the pressing surface of the tightening nut, and is concentric with the seal surface.

While the screw sleeves 13, 23 and 33 are welded or brazed in the above examples, it is obvious that those may be formed integrally with the main pipe rails 11, 21 and 31 by forging.

However, the above-described related-art joint structures of the branch connectors have the following drawbacks.

DISCLOSURE OF INVENTION

In the joint structure of the branch connector disclosed in JP-A-10-213044, since the sleeve washer engaging with the branch connector with clearance is floatable and thus the contact between the sleeve washer and the back of the connecting head is variable, stable axial force cannot be transmitted. Moreover, when the wall thickness of the sleeve washer is small, the sleeve washer cuts into the back of the connecting head and reduces unscrewing torque. Thus, the axial force cannot be increased. Additionally, since the sleeve washer is outwardly expanded when the tightening nut is fastened, the axial force cannot be raised. There are still other problems in this example.

In the joint structure of the branch connector disclosed in JP-A-2001-82664, the sleeve washer is externally attached to the branch connector to be combined therewith into one piece by caulking or other method. When the branch connector such as an injection pipe tilts and a bending stress is generated, the stress concentrated on an inside end edge at an external opening of the sleeve washer decreases the bending fatigue strength of the branch connector. There are still other problems in this example.

In the joint structure of the branch connector disclosed in Japanese Patent Application No. 2000-174009, when axial force is applied in the condition where the axial centers of the floating type sleeve washers as two split parts are not aligned with each other, force in the falling direction is generated on the boundary surface (contact surface) of both the sleeve washers and the axial force is lost. Additionally, when the branch connector tilts and a bending stress is generated, the stress concentrated on an end of an external opening of the washer caulked to the branch connector lowers the bending fatigue strength of the branch connector. There are still other problems in this example.

Wherefore, the invention has been particularly developed to solve the problems arising from the joint structure of the branch connector shown in JP-A-2001-82664. It is an object of the invention to provide a joint structure of a branch connector used in a common rail, which is capable of not only securing axial force applied to a seal surface and a sleeve washer but also increasing bending fatigue strength of the branch connector while avoiding a stress concentrated on an end of an external opening of the sleeve washer even when bending force or bending moment is applied to the branch connector due to vibration of an engine or a vehicle.

A joint structure of a branch connector for a common rail according to the invention includes a screw sleeve attached to or formed on a main pipe rail so as to be concentric with a bearing surface of the main pipe rail and connects a branch connector to the main pipe rail via a sleeve washer which has been externally fixed to the branch connector in advance to be combined therewith as one piece. In the joint structure of the branch connector for the common rail, a clearance is provided between an inner surface of the sleeve washer at an external opening thereof and an outer surface of the branch connector.

The clearance is provided by a tapered surface formed by outwardly enlarging a diameter of the inner surface of the sleeve washer at the external opening. An inside end edge of the tapered surface at the external opening is a circular arc surface, or both the inside end edge of the tapered surface at the external opening and an inner end of the tapered surface are circular arc surfaces. It is preferable that a vertical angle of the tapered surface is set within a range from 4 to 15 degrees.

As other methods of forming the clearance, the clearance is provided by a large circular arc surface formed by outwardly enlarging a diameter of the inside end of the sleeve washer at the external opening, or provided by a small circular arc surface formed by the inside end edge of the sleeve washer at the external opening and a large circular arc surface formed adjacent to the inner end of the small circular arc surface.

It is preferable that the length of the clearance in the direction of the axial center is set within a range from 0.5 D to 1.2 D when D is the outside diameter of the branch connector.

It is obvious that a sleeve washer having a brim at its head may be used as the sleeve washer included in the joint structure of the branch connector for the common rail according to the invention.

In the joint structure including the screw sleeve and the sleeve washer externally fixed to the branch connector to be combined therewith into one piece according to the invention, the clearance is provided between the inner surface of the sleeve washer at the external opening thereof and the outer surface of the branch connector. Thus, not only can the branch connector be flexibly bended in the vicinity of the end of the external opening of the sleeve washer, but also bending fatigue strength of the branch connector can be secured since bending force and bending moment applied to the branch connector is not concentrated on the end of the external opening of the sleeve washer.

It is preferable that the vertical angle of the tapered inner surface of the sleeve washer at the external opening is set within a range from 4 to 15 degrees. When the angle is smaller than 4 degrees, the clearance is buried with formation of a connecting head of the branch connector and thus desirable advantages cannot be offered. When the angle exceeds 15 degrees, the clearance becomes too large and the contact surface becomes too small, which makes it difficult to secure sufficient axial force of the branch connector.

It is preferable that the length of the tapered surface in the direction of the axial center is set within a range from 0.5 D to 1.2 D when D is the outside diameter of the branch connector. When the length is smaller than 0.5 D, the clearance cannot be secured at the time of formation of the connecting head of the branch connector since the absolute volume of the clearance is insufficient. When the length exceeds 1.2 D, a sufficient fixing portion of the sleeve washer for holding the branch connector cannot be provided.

When a sleeve washer having a brim at its head is used as the sleeve washer included in the joint structure of the branch connector for the common rail according to the invention, sufficient contact surface between the sleeve washer and the tightening nut can be secured and thus larger axial force can be exerted than in the case that a brimless sleeve washer is used.

In the joint structure of the branch connector for the common rail according to the invention including the screw sleeve and the sleeve washer which has been externally fixed to the branch connector in advance to be combined therewith as one piece, the clearance formed by the tapered surface or the circular arc surface is provided between the inner surface of the sleeve washer at the external opening thereof and the outer surface of the branch connector. Thus, the branch connector can be flexibly bended in the vicinity of the end of the external opening of the sleeve washer, and bending fatigue strength of the branch connector can be secured since bending stress applied to the branch connector is not concentrated on the end of the external opening of the sleeve washer.

BEST MODE FOR CARRYING OUT THE INVENTION

In FIGS. 1 through 9, a main pipe rail 1, a branch connector 2, a sleeve nipple 3, a tightening cap nut 4, sleeve washers 5a through 5d, clearances 6a and 6b according to the invention are shown.

The main pipe rail 1 as a common rail is a steel pipe for high pressure pipe arrangement which is made of SCM 435 or the like and includes a pipe-shaped portion having a relatively large thickness, which is 28 mm in diameter and 9 mm in thickness, for example. A flow passage 1-1 is provided within the main pipe rail 1 along its axial center.

A screw surface 3-1 is formed on the outer surface of the pipe-shaped sleeve nipple 3 as a joint. The screw surface 3-1 engages with the tightening cap nut 4 attached to the branch connector 2. The base end of the sleeve nipple 3 is directly welded or brazed to the outer peripheral wall of the main pipe rail 1. (The base end may be formed integrally with the main pipe rail 1 by forging.) In a subsequent finishing process, a branch hole 1-2 having a pressure-receiving bearing surface 1-3 is formed, which surface is provided in a portion of the main pipe rail 1 surrounded by the sleeve nipple 3 to be conical and open to the outside and communicate with the flow passage 1-1 of the main pipe rail 1.

The branch connector 2 is formed by a branch pipe or a branch fitting. A flow path 2-1 communicating with the flow passage 1-1 of the main pipe rail 1 is provided within the branch connector 2. A pressing bearing surface 2-3 is formed by a connecting head 2-2 which is disposed at an end of the branch connector 2 and is formed into a tapered and conical shape having an enlarged diameter by buckling, for example.

The sleeve washers 5a through 5d according to the invention are externally and rigidly fixed to a main body of the branch connector 2. For fixing the sleeve washers 5a through 5d, caulking methods such as: contact-bonding the sleeve washers 5a through 5d to the outer surface of the branch connector 2 by applying pressure in the radial direction from the inside of the branch connector 2; reducing the diameters of the cylindrical portions of the sleeve washers 5a through 5d from outside; enlarging the diameter of the branch connector 2 at the time of press-molding of the connecting head 2-2 of the branch connector 2; and combining these methods may be used. In these cases, it is more effective to make the outer surface of the branch connector 2 or the inner surfaces of the sleeve washers 5a through 5d coarse. Alternatively, the sleeve washers 5a through 5d may be fixed to branch connector 2 by screw engagement, for example.

Figure 1:
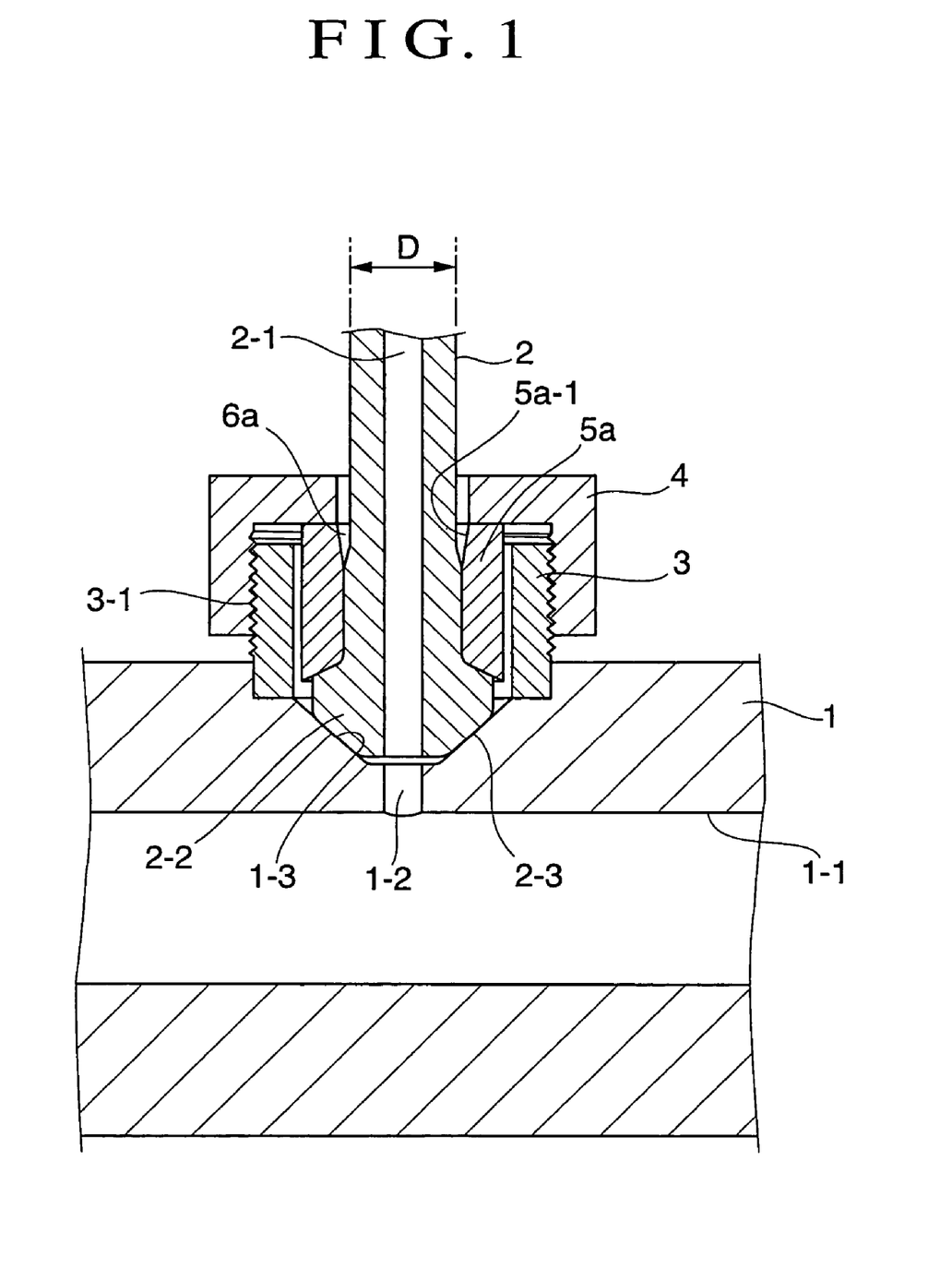
FIG. 1 is a vertical cross-sectional view of a joint structure of a branch connector for a common rail in a first aspect according to the invention.
Figure 2:
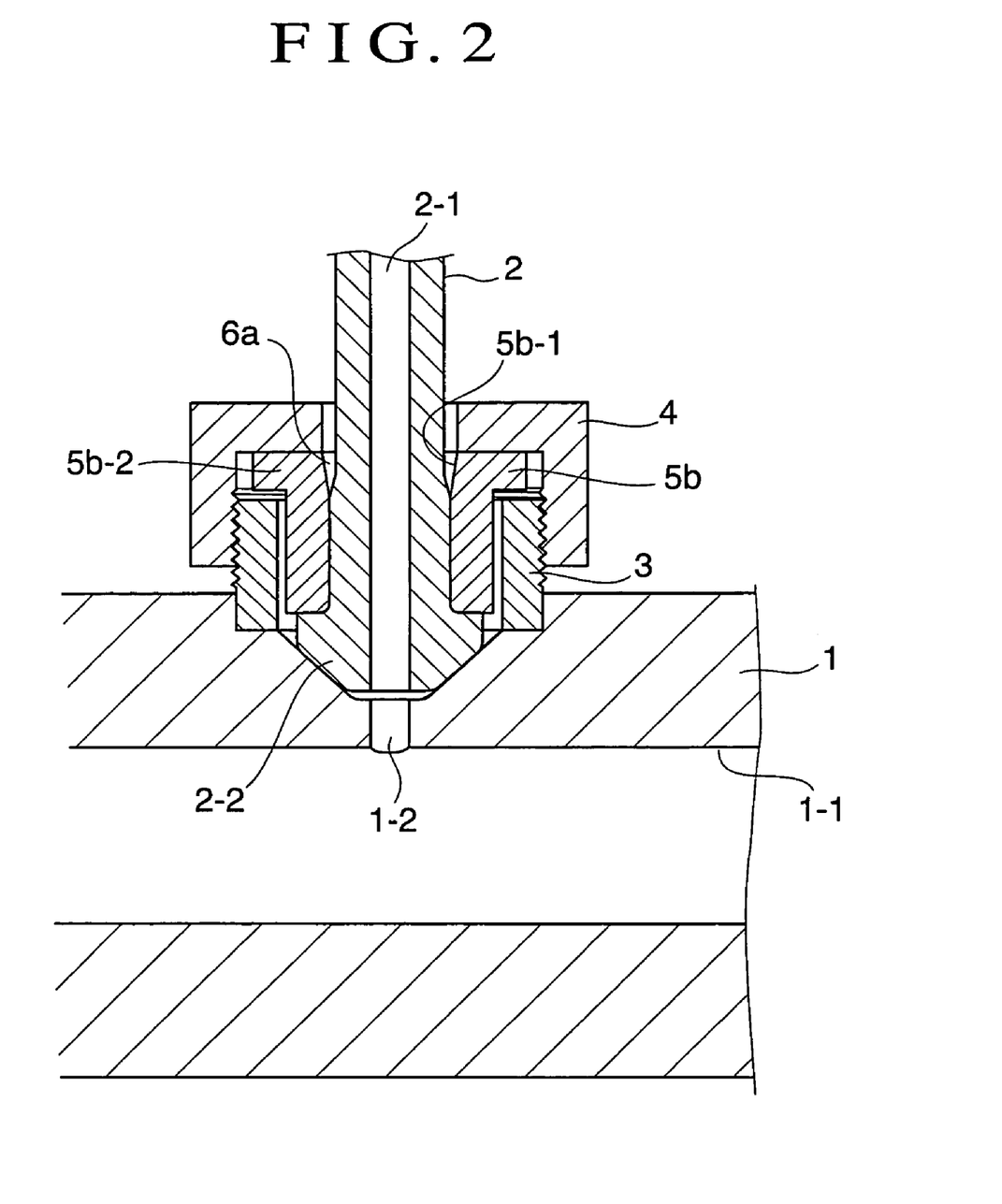
FIG. 2 is a vertical cross-sectional view of a main part of a joint structure of a branch connector for a common rail in a second aspect.
Figure 3:
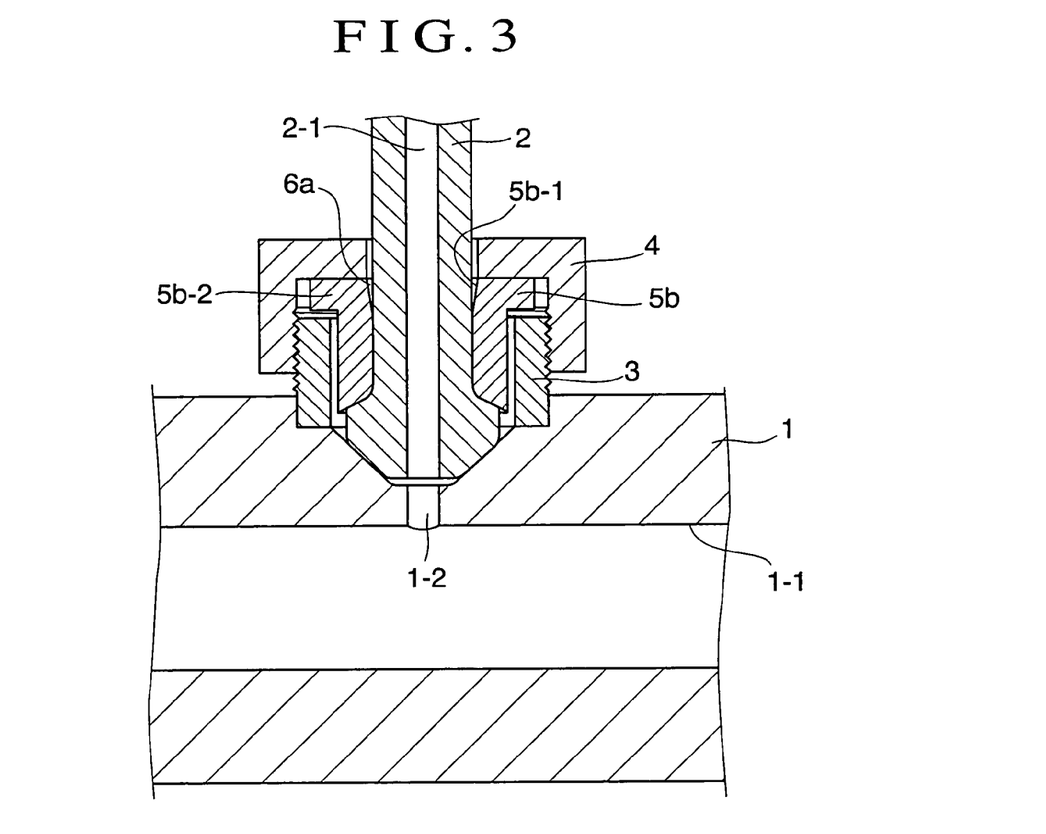
FIG. 3 is a vertical cross-sectional view of a main part of a joint structure of a branch connector for a common rail in a third aspect.
Figure 4:
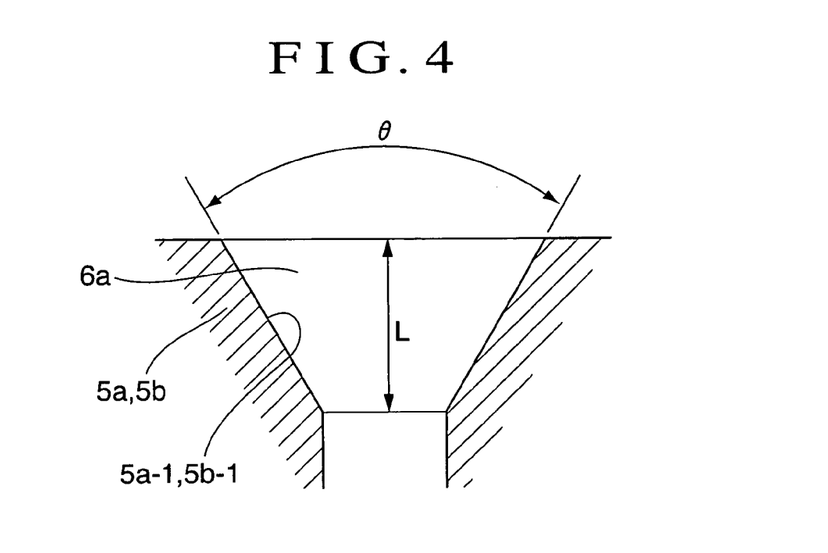
FIG. 4 is an enlarged cross-sectional view of a clearance of a sleeve washer in the aspects shown in FIGS. 1 through 3.

The sleeve washers 5a and 5b shown in FIGS. 1 through 3 have tapered surfaces 5a-1 and 5b-1, respectively, each formed by increasing the diameter of the inner surface of the sleeve washer 5a or 5b at the external opening thereof as shown in an enlarged view of FIG. 4. The sleeve washer 5a shown in FIG. 1 is a straight pipe having no brim (flange) at an end. The sleeve washer 5b shown in FIGS. 2 and 3 is a brimmed pipe having a brim (flange) 5b-2 at an end. For fixing the brimless sleeve washer 5a and the brimmed sleeve washer 5b, the method of contact-bonding the sleeve washer 5a or 5b by enlarging the diameter of the branch connector 2 at the time of press-molding the connecting head 2-2 of the branch connector 2 is employed for the structures shown in FIGS. 1 and 2, and the method of contact-bonding the sleeve washer 5b to the outer surface of the branch connector 2 by applying pressure from the inside of the branch connector 2 in the radial direction is employed for the structure of FIG. 3.

A vertical angle θ of the tapered surfaces 5a-1 and 5b-1 of the brimless sleeve washer 5a and the brimmed sleeve washer 5b is set within a range from 4 to 15 degrees. A length L of the tapered surfaces 5a-1 and 5b-1 in the direction of the axial center is within a range from 0.5 D to 1.2 D when D is the outside diameter of the branch connector 2.

Figure 5A:
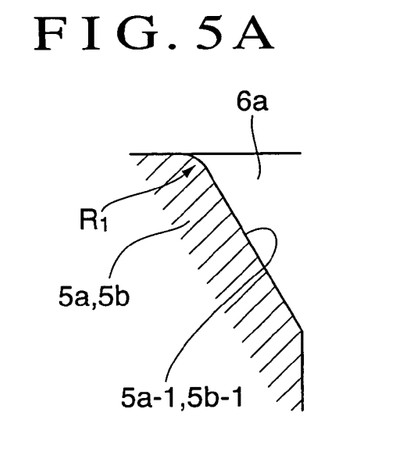
FIG. 5A is an enlarged cross-sectional view of the clearance of the sleeve washer in the aspects shown in FIGS. 1 through 3, which clearance is formed by a tapered surface having a circular-arc-shaped inside end edge of the sleeve washer at an external opening thereof.
Figure 5B:
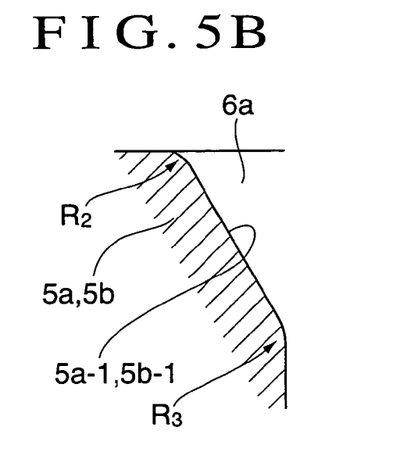
FIG. 5B is an enlarged cross-sectional view of the clearance of the sleeve washer in the aspects shown in FIGS. 1 through 3, which clearance is formed by a tapered surface of the sleeve washer having both a circular-arc-shaped inside end edge at the external opening and a circular-arc-shaped inner end.

The tapered surface for forming the clearance of the brimless sleeve washer 5a or the brimmed sleeve washer 5b is not limited to the flat surface as described above, but may be: a surface formed by the tapered surface 5a-1 or 5b-1 and a portion having a small radius of curvature R1 as illustrated in FIG. 5A; or a surface formed by the tapered surface 5a-1 or 5b-1, a portion having a small radius of curvature R2 and a large radius of curvature R3 as illustrated in FIG. 5B. The respective radii of curvature may be arbitrarily established.

Figure 6:
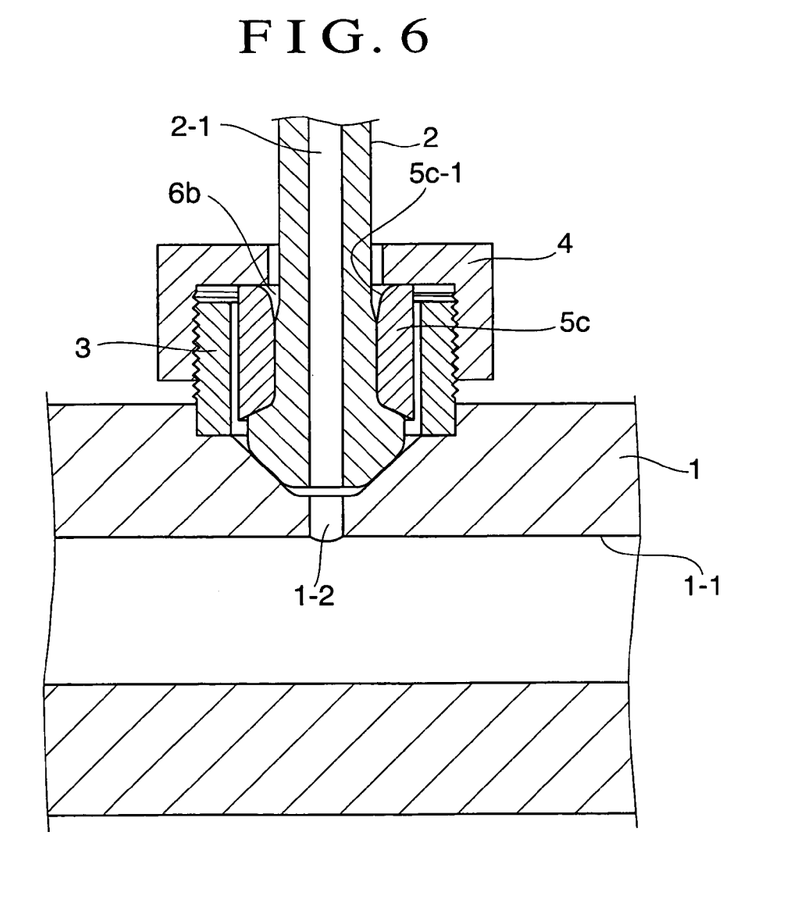
FIG. 6 is a vertical cross-sectional view of a main part of a joint structure of a branch connector for a common rail in a fourth aspect according to the invention.
Figure 7:
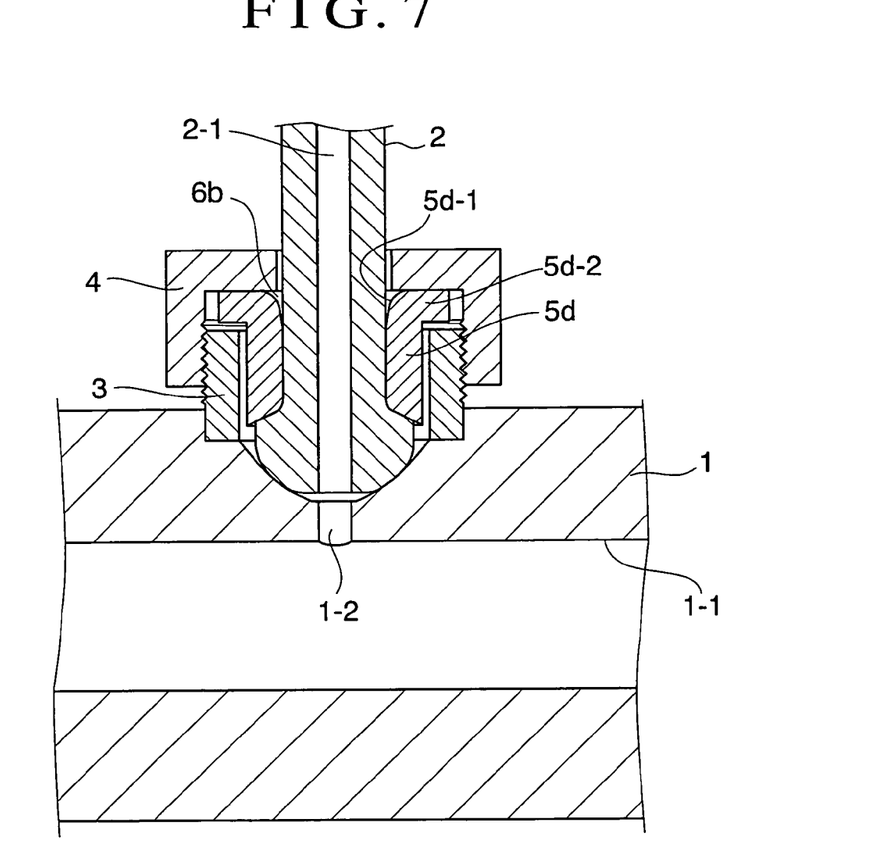
FIG. 7 is a vertical cross-sectional view of a main part of a joint structure of a branch connector for a common rail in a fifth aspect.
Figure 8:
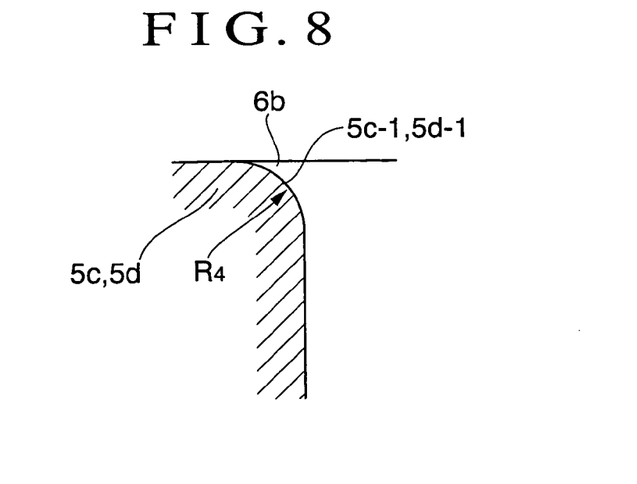
FIG. 8 is an enlarged cross-sectional view of a clearance of a sleeve washer in the aspects shown in FIGS. 6 and 7.

The sleeve washers 5c and 5d shown in FIGS. 6 and 7 have circular arc surfaces 5c-1 and 5d-1, respectively, each having a radius of curvature R4 to outwardly enlarge the diameter at the inside edge of the external opening as illustrated in an enlarged view of FIG. 8. The sleeve washer 5c shown in FIG. 6 is a straight pipe having no brim (flange) at an end. The sleeve washer 5d shown in FIG. 7 is a brimmed pipe having a brim (flange) 5d-2 at an end.

Figure 9A:
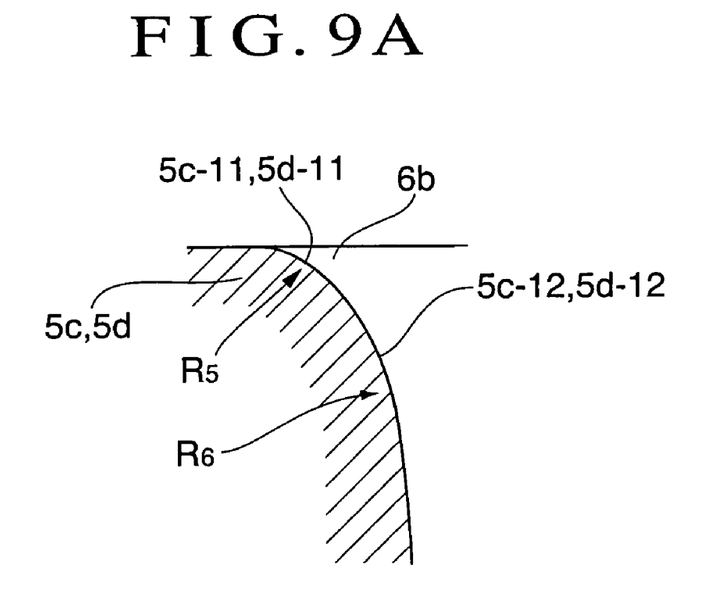
FIG. 9A is an enlarged cross-sectional view of the clearance of the sleeve washer in the aspects shown in FIGS. 6 and 7, which clearance is formed by a circular arc surface having a large radius of curvature and a circular arc surface having a small radius of curvature.
Figure 9B:
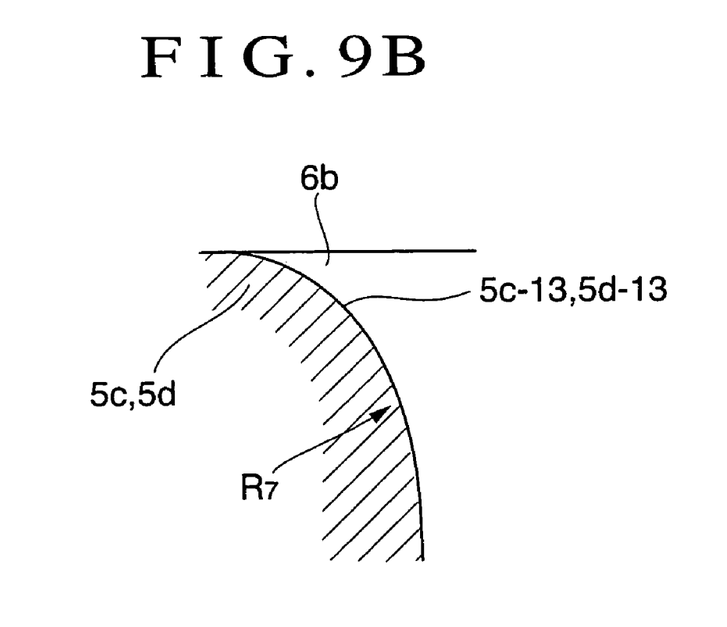
FIG. 9B is an enlarged cross-sectional view of the clearance of the sleeve washer in the aspects shown in FIGS. 6 and 7, which clearance is formed by a circular arc surface having a large radius of curvature.

The circular arc surface for forming the clearance of the brimless sleeve washer 5c or the brimmed sleeve washer 5d is not limited to the above-described circular arc surface 5c-1 or 5d-1 having the radius of curvature R4, but may be: a surface formed by a circular arc surface 5c-11 or 5d-11 having a small radius of curvature R5 and a circular arc 5c-12 or 5d-12 having a large radius of curvature R6 as illustrated in FIG. 9A; or a surface formed only by a circular arc surface 5c-13 or 5d-13 having a small radius of curvature R7 as illustrated in FIG. 9B. The respective radii of curvature may be arbitrarily established.

The material of the sleeve washers 5a through 5d is preferably the same as the material of the main pipe rail 1 or a material having larger strength than that material. For example, a hard material such as S45C and SCM435 which is heat-treated may be used.

According to the joint structure of the branch connector 2 shown in FIGS. 1 through 9, the branch connector 2 is connected by the following method: first, the pressing bearing surface 2-3 formed by the connecting head 2-2 of the branch connector 2 contacts and engages with the pressure-receiving bearing surface 1-3 of the main pipe rail 1; then, the tightening cap nut 4 which has been attached to the branch connector 2 in advance via the sleeve washers 5a through 5d is screw-fitted to the sleeve nipple 3; finally, the branch connector 2 is tightly fitted by pressure of the tightening cap nut 4 applied to the neck of the connecting head 2-2 so that the branch connector 2 can be connected.

In the joint structure shown in FIGS. 1 through 3, the clearance 6a is formed by the tapered surface 5a-1 or 5b-1 provided at the external opening of the brimless sleeve washer 5a or the brimmed sleeve washer 5b, respectively. The brimless sleeve washer 5a and the brimmed sleeve washer 5b are externally attached to the branch connector 2 and combined therewith as one piece such that the clearance 6a can be formed. In this joint structure, axial force is mainly applied to the branch connector 2 on the contact-bonding surface between the branch connector 2 and the brimless sleeve washer 5a or the brimmed sleeve washer 5b.

In the joint structure shown in FIGS. 6 and 7, the clearance 6b is formed by the large circular arc surface 5c-1 or 5d-1 provided at the external opening of the brimless sleeve washer 5c or the brimmed sleeve washer 5d, respectively. The brimless sleeve washer 5c and the brimmed sleeve washer 5d are externally attached to the branch connector 2 and combined therewith as one piece such that the clearance 6b can be formed. In this joint structure, axial force is mainly applied to the branch connector 2 on the contact-bonding surface between the branch connector 2 and the brimless sleeve washer 5c or the brimmed sleeve washer 5d.

INDUSTRIAL APPLICABILITY

The joint structure of the branch connector of the invention is applicable not only to a separate joint type common rail in which a screw sleeve (pipe-shaped sleeve nipple) is welded or brazed to a peripheral wall of a main pipe rail, but also to an integral joint type common rail in which a boss for a screw sleeve is formed integrally with a peripheral wall of a main pipe rail.

What is claimed is:

1. A joint structure of a branch connector for a common rail, comprising a screw sleeve concentric with a bearing surface of a main pipe rail and connecting a branch connector to the main pipe rail via a sleeve washer which has been externally fixed to the branch connector in advance to be combined therewith as one piece, wherein:
   the branch connector has a main body with an outer surface, at least a portion of which is cylindrical;
   the sleeve washer has a first end facing substantially towards the main pipe rail, a second end opposite the first end and an inner surface extending from the first end to the second end, the inner surface having a first longitudinal section in proximity to the first end of the sleeve washer, the first longitudinal section being cylindrical and being fixed rigidly to the outer surface of the main body of the branch connector; and
   the inner surface having a second longitudinal section extending from the first longitudinal section of the inner surface of the sleeve washer to the second end of the sleeve washer, the second longitudinal section being spaced outwardly from the outer surface of the main body of the branch connector so that a clearance is provided between the inner surface of the sleeve washer and the outer surface of the branch connector along the second longitudinal section of the inner surface of the sleeve washer, wherein the clearance is provided by a taper surface formed by outwardly enlarging a diameter of the inner surface of the sleeve washer along the second longitudinal section.

2. The joint structure of a branch connector for a common rail as set forth in claim 1, wherein the tapered surface at the second end is an outwardly curved arc surface.

3. The joint structure of a branch connector for a common rail as set forth in claim 2, wherein the first and second longitudinal sections of the inner surface meet at the outwardly curved arc surface.

4. The joint structure of a branch connector for a common rail as set forth in claim 1, wherein the tapered surface is aligned to the first longitudinal section of the inner surface at an angle within a range from 4 to 15 degrees.

5. The joint structure of a branch connector for a common rail as set forth in claim 1, wherein a length of the clearance measured parallel to an axial center of the branch connector is set within a range from 0.5 D to 1.2 D when D is an outside diameter of the branch connector.

6. The joint structure of a branch connector for a common rail as set forth in claim 1, wherein the first longitudinal section defines an axial length that exceeds a radial thickness of the sleeve washer along the first longitudinal section.

7. The joint structure of a branch connector for a common rail as set forth in claim 1, wherein no part of the inner surface of the sleeve washer is threaded.

8. A joint structure for a common rail, comprising:
   a main pipe rail having a peripheral wall and a flow passage extending axially therethrough, a branch hole extending outwardly through the peripheral wall from the flow passage and an outwardly tapered bearing surface communicating with the branch hole;
   a screw sleeve secured to the wall of the main pipe rail and being concentric with the bearing surface;
   a branch connector having a connecting head at one end, a pressing bearing surface on the connecting head contacting the bearing surface of the main pipe rail, the branch connector having a main body adjacent the connecting head, the main body being formed with an outer surface, at least a portion of the outer surface of the main body adjacent the connecting head being cylindrical; and
   a sleeve washer having opposite first and second ends and an inner surface extending between the ends of the sleeve washer, the inner surface of the sleeve washer being telescoped over the branch connector so that the first end thereof is substantially adjacent the connecting head of the branch connector, the inner surface of the sleeve washer having a substantially cylindrical first longitudinal section in proximity to the first end and a second longitudinal section extending from the first longitudinal section to the second end of the sleeve washer, the first longitudinal section of the inner surface of the sleeve washer being fixed rigidly to the cylindrical portion of the outer surface of the main body of the branch connector adjacent the connecting head, the outer surface of the branch connector and the second longitudinal section of the inner surface of the sleeve washer being configured so that a clearance is defined between the branch connector and the inner surface of the sleeve washer adjacent the second end thereof, wherein the clearance is provided by a taper formed by outwardly enlarging a diameter of the inner surface of the sleeve washer along the second longitudinal section of the inner surface.

9. The joint structure for a common rail as set forth in claim 8, wherein the taper includes an outwardly curved arc surface at the second end.

10. The joint structure for a common rail as set forth in claim 8, wherein the taper meets the substantially cylindrical first longitudinal section of the inner surface at an outwardly curved circular arc surface.

11. The joint structure for a common rail as set forth in claim 8, wherein the taper is aligned to the substantially cylindrical first longitudinal section of the inner surface at an angle in a range from 4 to 15 degrees.

12. The joint structure for a common rail as set forth in claim 8, wherein a length of the clearance in a direction of an axial center of the branch connector is set within a range from 0.5 D to 1.2 D when D is an outside diameter of the branch connector.

13. The joint structure of a branch connector for a common rail as set forth in claim 8, wherein the first longitudinal section defines an axial length that exceeds a radial thickness of the sleeve washer along the first longitudinal section.

14. The joint structure of a branch connector for a common rail as set forth in claim 8, wherein no part of the inner surface of the sleeve washer is threaded.

15. A joint structure of a branch connector for a common rail, comprising a screw sleeve concentric with a bearing surface of a main pipe rail and connecting a branch connector to the main pipe rail via a sleeve washer which has been externally fixed to the branch connector in advance to be combined therewith as one piece, wherein:
   the branch connector has a main body with an outer surface, at least a portion of which is cylindrical;
   the sleeve washer has a first end facing substantially towards the main pipe rail, a second end opposite the first end and an inner surface extending from the first end to the second end, the inner surface having a first longitudinal section in proximity to the first end of the sleeve washer, the first longitudinal section being cylindrical and being fixed rigidly to the outer surface of the main body of the branch connector; and
   the inner surface having a second longitudinal section extending from the first longitudinal section of the inner surface of the sleeve washer to the second end of the sleeve washer, the second longitudinal section being spaced outwardly from the outer surface of the main body of the branch connector so that a clearance is provided between the inner surface of the sleeve washer and the outer surface of the branch connector along the second longitudinal section of the inner surface of the sleeve washer, wherein the clearance is provided by a circular arc surface formed by outwardly enlarging a diameter of the inner surface of the sleeve washer at the second end.

16. A joint structure of a branch connector for a common rail comprising a screw sleeve concentric with a bearing surface of a main pipe rail and connecting a branch connector to the main pipe rail via a sleeve washer which has been externally fixed to the branch connector in advance to be combined therewith as one piece, wherein:
   the branch connector has a main body with an outer surface, at least a portion of which is cylindrical;
   the sleeve washer has a first end facing substantially towards the main pipe rail, a second end opposite the first end and an inner surface extending from the first end to the second end, the inner surface having a first longitudinal section in proximity to the first end of the sleeve washer, the first longitudinal section being cylindrical and being fixed rigidly to the outer surface of the main body of the branch connector; and
   the inner surface having a second longitudinal section extending from the first longitudinal section of the inner surface of the sleeve washer to the second end of the sleeve washer, the second longitudinal section being spaced outwardly from the outer surface of the main body of the branch connector so that a clearance is provided between the inner surface of the sleeve washer and the outer surface of the branch connector along the second longitudinal section of the inner surface of the sleeve washer, wherein the clearance is provided by a first circular arc surface on the inner surface of the sleeve washer at the second end and a second circular arc surface formed between the first circular arc surface and the first longitudinal section of the inner surface, the second circular arc surface being larger than the first circular arc surface.

17. A joint structure for a common rail, comprising:
   a main pipe rail having a peripheral wall and a flow passage extending axially therethrough, a branch hole extending outwardly through the peripheral wall from the flow passage and an outwardly tapered bearing surface communicating with the branch hole;
   a screw sleeve secured to the wall of the main pipe rail and being concentric with the bearing surface;
   a branch connector having a connecting head at one end, a pressing bearing surface on the connecting head contacting the bearing surface of the main pipe rail, the branch connector having a main body adjacent the connecting head, the main body being formed with an outer surface, at least a portion of the outer surface of the main body adjacent the connecting head being cylindrical; and
   a sleeve washer having opposite first and second ends and an inner surface extending between the ends of the sleeve washer, the inner surface of the sleeve washer being telescoped over the branch connector so that the first end thereof is substantially adjacent the connecting head of the branch connector, the inner surface of the sleeve washer having a substantially cylindrical first longitudinal section in proximity to the first end and a second longitudinal section extending from the first longitudinal section to the second end of the sleeve washer, the first longitudinal section of the inner surface of the sleeve washer being fixed rigidly to the cylindrical portion of the outer surface of the main body of the branch connector adjacent the connecting head, the outer surface of the branch connector and the second longitudinal section of the inner surface of the sleeve washer being configured so that a clearance is defined between the branch connector and the inner surface of the sleeve washer adjacent the second end thereof, wherein the clearance is provided by a circular arc surface formed by outwardly enlarging a diameter of the inner surface of the sleeve washer at the second end.

18. A joint structure for a common rail, comprising:
   a main pipe rail having a peripheral wall and a flow passage extending axially therethrough, a branch hole extending outwardly through the peripheral wall from the flow passage and an outwardly tapered bearing surface communicating with the branch hole;
   a screw sleeve secured to the wall of the main pipe rail and being concentric with the bearing surface;
   a branch connector having a connecting head at one end, a pressing bearing surface on the connecting head contacting the bearing surface of the main pipe rail, the branch connector having a main body adjacent the connecting head, the main body being formed with an outer surface, at least a portion of the outer surface of the main body adjacent the connecting head being cylindrical; and
   a sleeve washer having opposite first and second ends and an inner surface extending between the ends of the sleeve washer, the inner surface of the sleeve washer being telescoped over the branch connector so that the first end thereof is substantially adjacent the connecting head of the branch connector, the inner surface of the sleeve washer having a substantially cylindrical first longitudinal section in proximity to the first end and a second longitudinal section extending from the first longitudinal section to the second end of the sleeve washer, the first longitudinal section of the inner surface of the sleeve washer being fixed rigidly to the cylindrical portion of the outer surface of the main body of the branch connector adjacent the connecting head, the outer surface of the branch connector and the second longitudinal section of the inner surface of the sleeve washer being configured so that a clearance is defined between the branch connector and the inner surface of the sleeve washer adjacent the second end thereof, wherein the clearance is provided by a first circular arc surface on the inner surface of the sleeve washer at the second end and a second circular arc surface formed between the first circular arc surface and the first longitudinal section of the inner surface, the second circular arc surface being larger than the first circular arc surface.

* * * * *